United States Patent [19]
Kuiff et al.

[11] 3,851,368
[45] Dec. 3, 1974

[54] ELECTRICAL CONNECTING TERMINAL

[75] Inventors: Siegfried Kuiff, Merkstein; Heinz Karla, Herzogenrath; Gerd Frings, Merkstein, all of Germany

[73] Assignee: Saint-Gobain Industries, Neuilly-sur-Seine, France

[22] Filed: Sept. 24, 1973

[21] Appl. No.: 400,062

[30] Foreign Application Priority Data
Oct. 9, 1972 France .............................. 72.35648

[52] U.S. Cl. ................... 29/203 R, 29/493, 29/611, 29/630 R
[51] Int. Cl. ..................... H01r 43/00, H05k 13/04
[58] Field of Search ... 29/203 DT, 493, 611, 630 R, 29/203 R

[56] References Cited
UNITED STATES PATENTS
3,553,833  1/1971  Jochim et al. ........................ 29/611

*Primary Examiner*—Thomas H. Eager
*Attorney, Agent, or Firm*—Pennie & Edmonds

[57] ABSTRACT

Method and apparatus for welding a metal connecting terminal to an electrically insulating material in a rapid and reliable manner by delivering the terminal to the object to which it is to be welded, welding the terminal onto the insulating material.

23 Claims, 2 Drawing Figures

PATENTED DEC 3 1974  3,851,368

ELECTRICAL CONNECTING TERMINAL

BACKGROUND OF THE INVENTION

In manufacturing electrical devices, it is often necessary to secure an electrical conductor to an electrical insulator. This can be accomplished through welding by induction or by heating the conductor through the Joule effect. A device in which heating of the spot to be welded is accomplished through induction is described in U.S. Pat. No. 3,553,833 and a device showing the use of the Joule effect is disclosed in German patent application No. DT-OS 2,128,784. Welding in the aforementioned disclosures is accomplished by manually placing the connecting terminal on the spot of the electrical insulator to which the terminal is to be welded. The electrical conductor is maintained in the proper orientation against the electrical insulator by supporting pieces. These supporting pieces are connected to electrical terminals and also used in the welding process.

By placing the electrical terminals and welding them in the manner disclosed in the aforementioned patents, an inordinate amount of time is lost in the production line facilities. In addition, this manual operation requires high labor costs and results in inaccuracies that are concommitant with manual operation.

SUMMARY OF THE INVENTION

In accordance with the teachings of the present invention, applicant has provided an improved machine for reliably and rapidly welding a terminal to an insulator. Applicant's machine includes a support table for holding the insulator in the proper plane. A magazine for holding a number of terminals in a stacked orientation is provided. A transfer strip cooperates with the magazine to remove a terminal from the magazine and deliver it to a first position located above the insulator. At the first position the terminal is removed from the transfer strip and then moved to a second position onto the insulator. The terminal is then welded onto the insulator at the desired location in the predetermined position. In this manner, applicant can rapidly deliver and weld a number of terminals with a high degree of accuracy and at a high production rate. In this manner, the applicant has been able to increase the accuracy and efficiency of his welding process and, at the same time, make it more economical.

DETAILED DESCRIPTION OF THE PREFERRED EMBODIMENT

Figure 1:
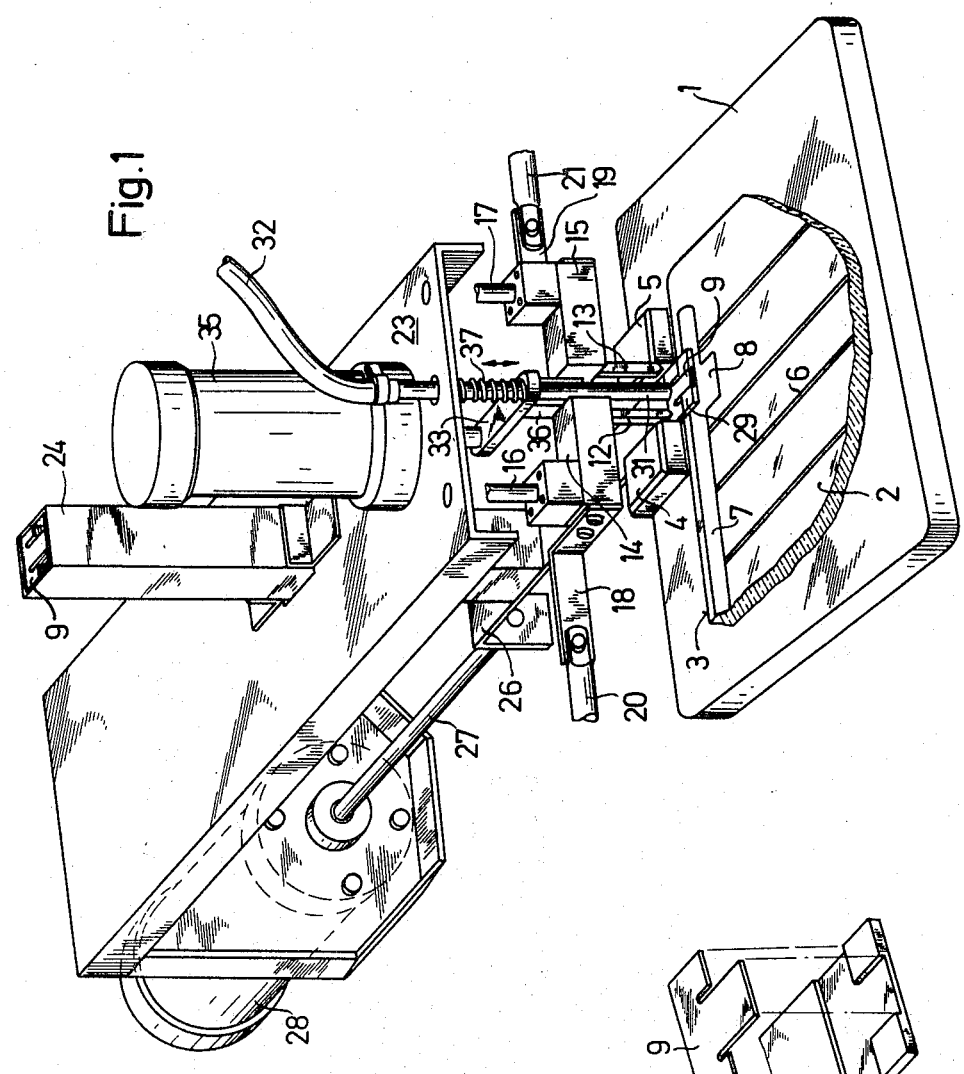
FIG. 1 is a general view of a short-circuit welding outfit, showing the essential parts of the invention.

The installation includes a table 1, on which glass sheet 2 is laid for the welding operation. Glass sheet 2 is laid on the table so that its edge 3 is supported against stops 4 and 5 in order then to be in good position for welding. The resistor conductors 6 deposited and heated on the surface of the glass are connected to collector band 7, which in turn is parallel to edge 3 of the sheet. The collector band has an extension 8 where connecting element 9 is to be welded.

Above table 1 is the welding head proper, comprising essentially the welding electrodes 12 and 13 fixed to pieces 14, 15 integral with supporting arms 16, 17, which can descend so that welding electrodes 12, 13 come in contact with the connecting element. The welding electrodes are connected to the secondary winding of the transformer by current lead-in bars 18, 19 and cables 20, 21. Arms 16, 17 are driven by a pneumatic jack not represented on the figure and mounted on bracket 23.

On this bracket 23 there is also placed a tubular magazine 24, the interior rectangular section of which matches the size of connecting elements 9; the latter are stacked in magazine 24 and drop, as needed, to the bottom of the magazine.

Figure 2:
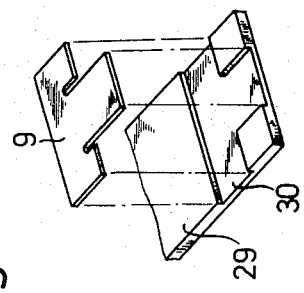
FIG. 2 is an enlarged detail of FIG. 1.

Strip 26, which is moved against bracket 23, closes the lower opening of the magazine and effects the transfer of the connecting terminal from the bottom of the magazine to the place of use. This strip 26 is connected to rod 27 of the pneumatic jack 28, which ensures the motion of strip 26 between two end positions well defined by the piston stroke. In the end-of-stroke position represented on the figure, the front part 29 of transfer strip 26 is above extension 8 of the collector band, that is, above the welding spot proper. The front part 29 of the strip is represented in enlargement on FIG. 2; it contains a housing having the shape of connecting terminal 9. In the end-of-stroke position represented on FIG. 1, the connecting terminal is lifted from its housing by vacuum tube 31. In the other end-of-stroke position, housing 30 is exactly under the lower opening of magazine 24 and extracts the following terminal from the magazine.

When transfer strip 26 is in front end-of-stroke position, a vacuum tube 31 is exactly above housing 30; this tube passes between supporting pieces 14, 15 and is connected to a vacuum pump by means of a three-way valve. Vacuum tube 31 is fixed to arm 33, which in turn is integral with the piston rod of pneumatic jack 35. Arm 33 contains shoulders 36 which slide between supporting pieces 14, 15. The spring 37 placed between arm 33 and bracket 23 is intended to damp the rising motion of vacuum tube 31 and thus prevent shocks which might possibly cause the connecting terminal suspended at the end of the vacuum tube to drop. A central control system, not represented, contains distributing elements, the purpose of which is to make the different movements of the installation follow each other in a predetermined logical sequence after starting of the installation.

The system may be put into operation after the glass sheet 2 is in a proper position on table 1 with welding spot 8 just below vacuum tube 31. The operation is initiated by pressing a push button which starts the control system to actuate elements in the predetermined sequence. The control system first actuates pneumatic jack 28 to move rod 27 and transfer strip 26 forward toward the end of stroke position. In the forward movement a connecting terminal 9 is removed from the magazine 24 and carried in housing 30 of the transfer strip to a position to the end of stroke position where the connecting terminal 9 is plumb with welding spot 8 and vacuum tube 31.

At the end of stroke position the control system then actuates the three-way valve to establish a vacuum in vacuum tube 31. Pneumatic jack 35 is then actuated to move arm 33 and in turn vacuum tube 31 downward until the lower end of the vacuum tube 31 contacts the terminal 9. The terminal is then drawn to the vacuum tube by the vacuum established therein. The control system then actuates pneumatic jack 35 to raise the vacuum tube 31 and terminal 9 slightly and, subsequently, the pneumatic jack 28 to return transfer strip 26 to a position wherein another connecting terminal drops from magazine 24 into housing 30.

After the transfer strip return movement, pneumatic jack 35 is again actuated by the control system to lower the connecting terminal 9 and place it on welding spot 8. Subsequently, another pneumatic jack (not shown) is actuated to move rods 16 and 17 and electrodes 12, 13 to which the rods are connected to a position where the electrodes support the terminal against the glass element. The vacuum tube 31 is then raised by actuating pneumatic jack 35 after which a current is started in the electrodes to bring the electrodes to the welding temperature. The terminal is then welded to the glass sheet. After the welding is completed the control system stops the current to the electrodes and raises the electrodes away from glass sheet 2 again through actuation of pneumatic jack 35. With the electrodes in a raised position the glass sheet is taken away and another one is placed in order to repeat the operation.

Delivery and removal of the glass sheet can be accomplished by any means integrated with the sequential operation of the welding machine. For instance, delivery and removal could be done automatically by a machine integrated with the welding machine control system. The delivery and removal operation is not the essence of the invention, thus further detailed description in this regard is obviated.

We claim:

1. A method for welding a metal connecting terminal to an electrical insulator including welding by induction and the Joule effect comprising:
   a. supporting said insulator in a predetermined plane;
   b. maintaining at least one terminal in a magazine;
   c. removing said terminal from said magazine;
   d. transferring said terminal from said magazine to a first position in a plane above said predetermined plane;
   e. moving said terminal to a second position onto said insulator; and
   f. welding said terminal onto said insulator at said second position.

2. The method according to claim 1 further comprising the orienting said terminal to an orientation which it will have when finally welded onto said insulator prior to the moving of said terminal to the second position.

3. The method according to claim 2 wherein, the magazine having an opening at one end, said maintaining includes maintaining several terminals in a stacked manner within the magazine and said removing includes removing one of said stacked terminals from said opening while maintaining the remaining terminals within the magazine.

4. The method according to claim 3 wherein said removing and transferring is accomplished by a transfer strip.

5. The method according to claim 4 wherein said transferring includes transferring the terminals to a first position at a vacuum source, holding the terminal at the first position by the vacuum source, withdrawing the transfer strip from the first position, and moving the terminal while held by the vacuum source to the second position.

6. The method according to claim 5 wherein said withdrawing includes moving the transfer strip back to a position for removing another terminal from the magazine.

7. The method according to claim 6 wherein the terminal is lowered onto a sheet of glass by the vacuum source.

8. The method according to claim 7 further comprising withdrawing the vacuum source from the terminal after welding.

9. The apparatus for welding a connecting terminal to an electrical insulator comprising:
   a. means for supporting said insulating material in a predetermined plane;
   b. means for holding at least one terminal in a magazine;
   c. means for removing the terminal from the magazine and transferring the terminal to a first position in a plane other than said predetermined plane;
   d. means for moving said terminal from the first position to a second position onto said electrically insulating material; and
   e. means for welding the terminal onto the insulating material.

10. The apparatus according to claim 9 wherein said means for holding said terminal includes a magazine open at the bottom and has means for holding several terminals in a stacked disposition.

11. The apparatus according to claim 10 wherein the means for holding the terminals in the magazine and the means for removing a terminal from the magazine and for transferring the terminal to the first position includes a transfer strip cooperating with the bottom of the magazine to remove one terminal while holding the remaining terminals in said stack.

12. The apparatus according to claim 11 wherein said transfer strip removes the terminal from the magazine and delivers it to the first position in an orientation which the terminal will have when finally welded to the insulator.

13. The apparatus according to claim 12 further comprising means for withdrawing the transfer strip from the first position after delivery of the terminal thereto, and means for maintaining the terminal at the first position as the transfer strip is withdrawn.

14. The apparatus according to claim 13 wherein the means for maintaining the terminal in the first position includes a vacuum source which grabs the terminal on the transfer strip.

15. The apparatus according to claim 14 wherein the means for moving the terminal includes the vacuum source for holding and moving the terminal until the terminal is moved onto said electrical insulator.

16. The apparatus according to claim 15 further comprising means for withdrawing the vacuum source after the terminal has been moved onto the electrical insulator.

17. The apparatus according to claim 16 wherein the means for welding the terminal onto the electrical insulator includes means for accomplishing the welding after the vacuum source has been removed from the terminal.

18. The apparatus according to claim 17 wherein the transfer strip contains a housing of the same shape as that of the terminal for orienting the terminal to the predetermined orientation.

19. The apparatus according to claim 18 wherein the vacuum source comprises a vacuum tube, a piston rod having a pneumatic jack, said vacuum tube being connected to the piston rod.

20. The apparatus according to claim 19 further comprising a fixed part and a spring placed between the tube and a fixed part for dampening the rising motion of the vacuum tube as it is removed from the terminal.

21. The apparatus according to claim 20 wherein said means for moving the terminal onto the electrical insulator and means for welding the terminal onto the electrical insulator includes two support fingers, one on each side of the vacuum tube for fixing the terminal onto the electrical insulator and welding the terminal thereto.

22. The apparatus according to claim 21 wherein the fingers weld the terminals at two points simultaneously.

23. The apparatus according to claim 22 wherein the electrical insulator is a glass member.

* * * * *